May 4, 1965     A. G. LLOYD     3,182,246
ELECTRICAL POWER SUPPLY REGULATOR SYSTEM
Filed Sept. 30, 1960     3 Sheets-Sheet 1

INVENTOR.
Allan G. Lloyd
BY John A. Harvey
Attorney

May 4, 1965  A. G. LLOYD  3,182,246
ELECTRICAL POWER SUPPLY REGULATOR SYSTEM
Filed Sept. 30, 1960  3 Sheets-Sheet 2

INVENTOR.
Allan G. Lloyd
By 
Attorney

Inventor
Allan G. Lloyd
By John A. Harvey
Attorney

United States Patent Office 3,182,246
Patented May 4, 1965

3,182,246
ELECTRICAL POWER SUPPLY REGULATOR SYSTEM
Allan G. Lloyd, Hanover, N.J., assignor, by mesne assignments, to General Mills, Inc., Minneapolis, Minn., a corporation of Delaware
Filed Sept. 30, 1960, Ser. No. 59,769
6 Claims. (Cl. 323—22)

The present invention relates to electrical power regulator systems and, particularly, to unidirectional power regulator systems for effecting energization of an electrical load at substantially constant energizing voltage. While the invention has utility in numerous and diverse applications, it has particular utility in association with power supply systems in which unidirectional power is obtained by rectification of alternating current and will be described in that connection.

It is often desirable to provide a source of unidirectional power derived either from an alternating current supply or from a unidirectional supply having a voltage differing from the value of load energizing voltage desired. In either event, alternating current power is transformed to a desired value of energizing voltage and when then rectified and filtered provides a unidirectional power source. This type of unidirectional power supply system has, for many applications, the undesirable characteristic that it exhibits relatively poor regulation. For these applications, a regulator system is often used at the filter output to maintain a substantially consant value of unidirectional energizing voltage with variations of the load current.

Many types of regulator systems have been proposed for this purpose, and one form utilizes a power regulation transistor having its emitter-collector electrodes arranged to conduct the load current and having its base electrode arranged to be supplied with a control current of value varying inversely with the output voltage of the system. Transistors are desirable for this purpose by reason of their low internal voltage drop and thus low power loss, but have the disadvantage that they may easily be destroyed by load currents in excess of their rated full load current. For example, a regulated power supply might have a two-ampere rated output and use a five-ampere rated regulator transistor but be capable of supplying twenty amperes of load current while still providing regulation of the output voltage of the system. This twenty ampere excessive load current translated by the regulator transistor may readily damage or deteriorate one or both of the transistor junctions because of excessively high local current density developed within the junction, causing local junction "hot spots." Accordingly, it is important that transistor power regulators be capable of delivering their full rated load current but that they not be required to deliver any current significantly in excess thereof. However, and in the interests of good over-all regulation, power supply systems are often designed such that upon a condition of short circuit they may deliver from five to ten times their full load current. These large values of overload current may quickly destroy a transistor power regulator.

It has been proposed that the power regulation transistor used in power regulator systems be protected from excess values of load current by use of another transistor having its emitter and collector electrodes also arranged to conduct the load current but having its base current suitably controlled to establish a constant-current limit upon the maximum value of permissible load current which may be supplied by the regulator system. While these arrangements may establish a desired constant-current limit, they often subject the load current translating transistor or transistors to excessive power dissipation. The power dissipation of a transistor has, at any time, a value given by the product of the emitter-collector current and the emitter-collector voltage. Where a transistor establishes a constant-current limit on the output load current, load conditions creating increasingly large current demands increase the transistor emitter-collector terminal voltage. Short circuits thus often cause substantially the full voltage of the power supply to be impressed across the emitter and collector-electrodes. If this supply voltage is sufficiently large due to good regulation of the power supply system, the excessively large although limited load current translated by the transistor and the large value of supply voltage impressed upon its emitter and collector electrodes subjects the transistor to greatly excessive values of power dissipation which may readily destroy it. These power regulation systems relying upon constant-current limiting of the load current have not heretofore been effective to limit the maximum value of constant current to a value less than something of the order of 150% of the full load current, and this large value of current may very quickly create destructive power dissipation within the regulating transistor in those power systems which are capable of supplying much more power than the transistor itself is able to dissipate.

It has also been proposed that overload protection of a power regulation transistor be provided by use of Zener semiconductor diodes or similar breakdown conductive devices which, upon becoming conductive, exhibit a relatively constant terminal voltage and thus may be used to place an upper limit upon the value of current supplied to the base electrode of the power regulation transistor under conrtol of the regulator system. This controlled value of base electrode current causes the power regulation transistor to exhibit constant-current characterisics to the flow of load current through it. These arrangements have not heretofore been capable of readily establishing a constant-current value appreciably less than about 150% of the full load current for which the transistor is rated, and accordingly often subject the regulating transistor to destructive power dissipation for reasons last explained. Even if exceedingly large power handling regulator transistors are used in these prior regulation systems to avoid destructive power dissipation of the transistor under conditions of excessive load current or short circuit of the regulation system output circuit, the power supply itself often is unable to dissipate all of the input power supplied to it under these conditions from its power source with the result that the internal temperature of the supply may soon rise to the destruction temperature of its components such as transformer windings and insulation, capacitors, resistors, and the like.

It is an object of the present invention to provide a new and improved electrical power supply regulator system of the transistorized type and one which avoids one or more of the disadvantages and limitations of prior such systems.

It is a further object of the invention to provide an electrical power supply regulator system which not only establishes a limitation upon the maximum value of overload current but responds to only moderately excessive overload conditions to effect substantial reduction of the load current to a relatively low average value while the overload condition prevails or even to terminate further supply of load current until the overload condition is removed and the system is manually restored to operation.

It is an additional object of the invention to provide an electrical power supply regulator system which responds to any overload condition even of small magnitude and automatically establishes a constant-current operating characteristic for the system and thereafter responds to even small further overloads automatically to effect substantial reduction of the load current which may be drawn from the system. An automatic test is periodically performed by the system to ascertain whether the overload condition continues to prevail, and the system maintains a substantially reduced average system load current during the overload condition and until it is removed after which the system is automatically restored to normal operation capable of supplying its full load value of current.

It is yet a further object of the invention to provide an electrical power supply regulator system which by use of semiconductor devices throughout is characterized by high operating efficiency and small and compact physical size, yet is one which provides an excellent voltage regulation characteristic over its full range of rated load current values while at the same time affording full protection to its semi-conductor devices under any and all prevailing load conditions which tend to cause its rated value of full load current to be exceeded.

Other objects and advantages of the invention will appear as the detailed description thereof proceeds in the light of the drawings forming a part of this application and in which:

FIG. 5 is a circuit diagram of a power supply regulator system embodying the invention in a further modified form, and FIG. 6 graphically represents an oscillatory condition prevailing upon overload of the FIG. 5 system and is used as an aid in explaining its operation;

Figure 1:
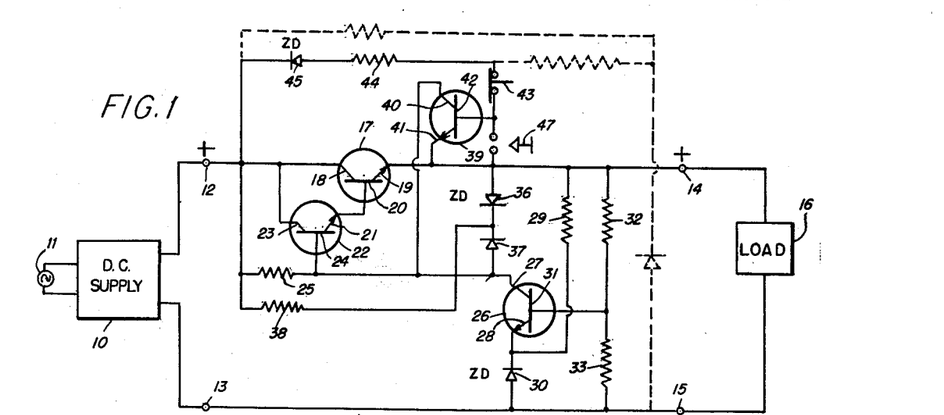
FIG. 1 is a circuit diagram representing an electrical power supply regulator system embodying the present invention in a particular form.

Referring now more particularly to the power supply regulator system of FIG. 1, a unidirectional power supply 10 of conventional form is shown by way of illustration as being energized from a suitable alternating current supply 11. The unidirectional power developed in the output circuit of the unit 10 is supplied to an input circuit indicated by terminals 12 and 13 of a power supply regulator system embodying the present invention and having an output circuit represented by terminals 14 and 15 from which power at substantially constant voltage may be supplied to a load device 16. A power translation regulator transistor 17 of the NPN type has its collector 18 and emitter 19 included in series between the input terminal 12 and the output terminal 14 to translate electrical power from the supply 10 to the load device 16. The transistor 17 has a base electrode 20 which is supplied with control current from the emitter 21 of an NPN type of transistor 22 having a collector electrode 23 connected to the positive conductor of the regulator input circuit. The base electrode 24 of the transistor 22 is supplied with control current through a resistor 25 from the positive conductor of the system input circuit, the magnitude of this control current being controlled by a transistor 26 of the NPN type having its collector electrode 27 also supplied with current through the resistor 25 and having its emitter electrode 28 coupled as shown to a voltage divider connected across the output circuit of the regulator system and including in series a resistor 29 and a Zener diode 30. The base 31 of the transistor 26 is supplied with control current from a voltage divider also connected across the output circuit of the regulator system and comprised by series resistors 32 and 33.

The regulator system thus far described is of conventional arrangement and has a well known mode of operation which will now be only briefly reviewed. The base electrode 31 of the transistor 26 is supplied with a value of control current proportional to the difference between a fraction of the output voltage of the regulator system and the Zener diode 30 reference voltage, and the resulting current of the collector 27 in flowing through the resistor 25 so controls the control current supplied to the base electrode 24 of the transistor 22 as to supply to the base electrode 20 of the regulator transistor 17 a value of base current tending to maintain at a substantially constant value the output circuit voltage used to energize the load 16. In this, it is well known that the transistor 17 exhibits an internal resistance between its emitter electrode 18 and its collector electrode 19, the value of this resistance being controlled by the value of control current supplied to its base electrode 20. Decreasing values of load current in flowing through the emitter-collector path of the transistor accordingly cause an increase of output circuit voltage which effects a corresponding reduction of the control current supplied to the base electrode of the regulator transistor 17. This increases the internal collector-emitter resistance of the latter and tends to reduce the output circuit voltage. Conversely, a decrease of output circuit voltage results by control action of the transistors 22 and 26 in an increase of the base current supplied to the regulator transistor 17 to reduce its internal collector-emitter resistance and thus tend to raise the output circuit voltage. It will be apparent from this brief description of the regulator system operation that should the load 16 draw a current in excess of the full rated current of the regulator transistor 17 or should the output circuit of the regulator system become short circuited, the regulatory control action of the transistors 22 and 26 is such that a maximum control current is supplied to the base electrode 20 of the transistor 17 to cause the latter to translate maximum load current. Any such overload condition may readily destroy the transistor 17 by reason of its thermal overload characteristic if the unidirectional supply system 10 is capable of furnishing a value of load current several times larger than the rated full load current of the transistor 17.

To prevent impairment or destruction of the regulator transistor 17 under such overload conditions as last described, a Zener diode 36 is connected in series with a semiconductor diode 37 between the positive conductor of the regulator system output circuit and the collector 27 of the transistor 26. The Zener diode 36 is rendered conductive during normal operation of the system by a potential supplied through a resistor 38 from the positive conductor of the input circuit of the system. The conductive state of the Zener diode 36 establishes a relatively fixed reference potential such that the semiconductor diode 37 becomes conductive when the potential of the collector electrode 27 of the transistor 26 is increased to a preselected value by reduction of the collector-emitter current flow through the transistor 26 and the resistor 25 in response to a decrease of potential of the output circuit of the regulator system. The semiconductor diode 37 upon becoming thus conductive limits the magnitude of the control current supplied to the base electrode 24 of the control transistor 22 and this in turn limits the control current which the latter transistor may supply to the base electrode 20 of the regulator transistor 17. The regulator transistor 17 thereupon operates as a constant-current device to supply a constant value of current to the output circuit of the regulator system irrespective of any further decrease of the output circuit potential. By selection of the values of the regulator system components, the constant current thus supplied by the regulator transistor 17 under overload conditions may be limited to a value of approximately 1.2 to 1.5 of the full load current.

In accordance with the present invention, the regulator transistor 17 is even further protected under conditions of excessive load current demand even though it is controlled to provide a constant value of current as last described. This additional protection is accomplished by a control transistor 39 of the NPN type having its collector electrode 40 connected to the collector electrode 27 and base electrode 24 of the respective transistors 26 and 22 and having its emitter electrode 41 connected to the positive conductor of the output circuit of the regulator system. The base electrode 42 of the control transistor 39 is connected through a manually operable switch 43, provided for reasons presently to be explained, a resistor 44, and a Zener diode 45 to the positive conductor of the input circuit of the regulator system. It will be noted that the Zener diode 45 is included with the resistor 44 and the emitter electrode 41 and base electrode 42 of the transistor 39 in a circuit extending directly between the positive conductors of the input and output circuits of the regulator system.

During normal operation of the regulator system there is insufficient difference of potential between the input and output circuits of the system to render the Zener diode 45 conductive. With the Zener diode 45 non-conductive, no current is supplied to the base electrode 42 of the transistor 39 and hence no current flows between its emitter and collector electrodes. However when the output circuit potential decreases to a preselected value, the potential difference between the input and output circuits causes the Zener diode 45 to be rendered conductive and base current is now supplied to the base electrode 42 of the transistor 39 to render the latter fully conductive. The resulting collector-emitter current of the transistor 39 in flowing through the resistor 25 reduces the current supplied to the base electrode 24 of the control transistor 22, and this in turn reduces the current supplied to the base electrode 20 of the regulator transistor 17. This control action by the transistor 39 may reduce the collector-emitter current of the regulator transistor 17 to a very low value or even to zero, thus terminating the supply of further load current to the output circuit of the regulator system.

The Zener diode 45 upon being rendered thus conductive continues to supply current to the base electrode 42 of the transistor 39 to maintain the latter fully conductive even though the short circuit or other overload condition which initiated the control operation described is removed. Since the fully conductive state of the transistor 39 prevents load current flow through the regulator transistor 17 in the manner just described, the transistor 39 must be rendered again non-conductive by manual actuation of either the series switch 43 to open-circuit the base current into base 42, or a shunt switch 47 to short circuit this base current. This restores the regulator system once again to normal operation.

Following establishment of the constant-current state of the regulator transistor 17 by an overload produced decrease of output circuit potential, only a slight further decrease of output circuit potential is effective to initiate the additional control action provided by the transistor 39 so that only a moderate overload condition is effective to terminate all load current translation by the transistor 17. The latter is thus fully protected and the value of constant current selected for its constant-current operation may be sufficiently low as to exceed the rated full-load current of the transistor by only a small amount. Thus the regulator transistor 17 is never subjected to load current demands which might tend to impair or destroy it by reason of its inherent thermal runaway characteristic.

Figure 2:
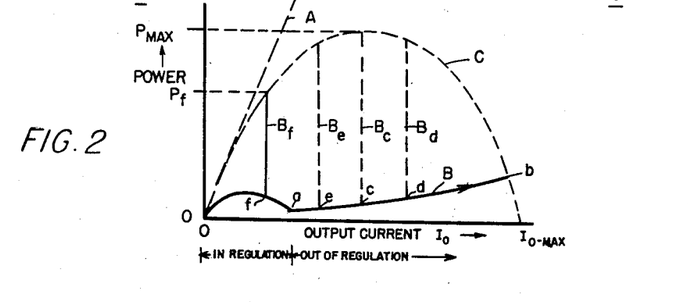
FIG. 2 graphically represents certain power relationships appearing in the operation of a transistorized power supply regulator system and is used as an aid in describing the operation of the FIG. 1 system.
Figures 3, 4:
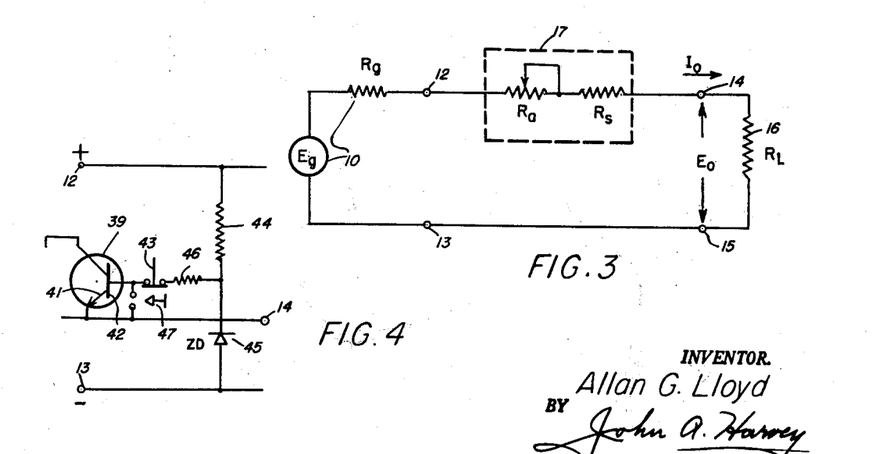
FIG. 3 is a simplified circuit of a portion of the FIG. 1 system and is used in explaining the power relationships graphically represented in FIG. 2.
FIG. 4 is a circuit diagram of a portion of a power supply regulator system and shows a modified form of the FIG. 1 system.

The operational characteristics of a power supply regulator system embodying the present invention are shown graphically in FIG. 2 considered with relation to the simplified circuit diagram of FIG. 3. In the latter, the direct current supply system 10 is represented as being comprised of a unidirectional voltage source $E_g$ having an internal resistance $R_g$. The regulator transistor 17 is represented as having an internal resistance between its collector electrode 18 and emitter electrode 19 comprised by two resistive components. One of these is a controllable resistance $R_a$ having a value which is controlled by the magnitude of the control current supplied to the base electrode 20 of the transistor 17 and has reduced resistive value with increasing values of the base current. The other resistive component is comprised by the saturation resistance $R_s$ which, as well known, is the minimum value of the internal resistance of the transistor when supplied with base drive current in excess of that required for normal conduction. The saturation region of a transistor is approximately the region below the knee of its collector-current versus collector-voltage characteristic for any maximum value of base current. The load 16 of the FIG. 1 arrangement is represented in FIG. 3 by a resistor $R_L$, and is supplied with a regulator system output current $I_0$.

FIG. 2 graphically represents certain power relations plotted as a function of the output current $I_0$. Broken line curve A represents the power which the voltage source 10 would deliver under the theoretically ideal condition that its internal resistance $R_g$ has zero value. Curve B represents the dissipation of the regulator transistor 17, whereas the broken line curve C represents the power delivered by the power supply 10 to the input terminals 12, 13 of the regulator system. It will be evident that this input power is given by the relation $$P_{in}=E_g I_0 - I_0^2 R_g \qquad (1)$$

and thus has zero value either when the output current $I_0$ has zero value or at a maximum value of output current given by the relation $$I_0 = E_g/R_g \qquad (2)$$

In a typical power supply system the maximum value of output current last mentioned may exceed many times the normal full load output current of the system, and the maximum power delivered to the regulator system occurs at one-half this value of maximum output current and is given by the relation $$P_{max} = E_g^2/4R_g \qquad (3)$$

The regulator transistor dissipation characteristic represented by curve B has two distinct portions O–a and a–b meriting particular consideration. The portion O–a of the dissipation curve B represents the regulator transistor dissipation over the range of values of output current $I_0$ where the regulator transistor operates in its non-saturated state and the system provides regulation of the output voltage $E_0$ appearing between its output terminals 14 and 15. The portion a–b of the dissipation curve B represents the regulator transistor dissipation with the transistor operating in its saturated state, the dissipation at this time being given by the relation $$P_s = I_0^2 R_s \qquad (4)$$

The point b of the dissipation curve B represents a value of power given by the relation $$P_{max(sat)} = E_g^2 R_s/(R_g + R_s)^2 \qquad (5)$$

In practical regulator systems, the regulator transistor dissipation seldom reaches the value represented by point b of curve B since the increasing values of output current $I_0$ eventually cause the transistor again to operate in its non-saturated state and exhibit constant-current characteristics due to the relatively fixed value of control current supplied to its base electrode. Thus in these instances the output current $I_0$ will increase to some value corresponding to a point such as point c or d or e of curve B at which the value of the output current $I_0$ is given approximately by the relation $$I_0 = \beta i_B \quad (6)$$

where $i_B$ represents the value of the control current supplied to the base of the regulator transistor and $\beta$ is the ratio of collector current to base current. Under the condition last mentioned the power dissipation curve of the regulator transistor would, with any further increase in value of the output current $I_0$, leave the curve B at the point c (or point d or point e) and increase sharply as represented by the broken line curve $B_c$ (or broken line curve $B_d$ or $B_e$) to a dissipation equal or very nearly equal the maximum value $P_{max}$. This is for the reason that the regulator transistor is operating at this time as a constant-current device limiting the output current $I_0$ to a relatively constant value and is subjected to a relatively large value of collector-emitter voltage. Under this operating condition, it will be apparent that the regulator transistor dissipation may quickly rise to very large values and result in rapid failure of the transistor by reason of its thermal overload characteristic.

In a regulator system embodying the present invention, the Zener diode 36 and the semiconductor diode 37 (FIG. 1) cause the regulator transistor 17 to operate as a constant-current device when the output current $I_0$ has some selected value such as that corresponding to point $f$ on the dissipation curve B of FIG. 2. This value of output current may readily be limited to a value of approximately 1.2 to 1.5 of the normal full load current of the regulator system. It will be noted that this value of output current $I_0$ is attained while the regulator system is yet within the permissible regulation region O to $a$. The power dissipation of the regulator transistor 17 now increases, and is represented by the portion $B_f$ of the dissipation curve so that the maximum dissipation of the regulator transistor is reduced to a value $P_f$. Actually, in a regulator system embodying the present invention the Zener diode 45 and control transistor 39 (FIG. 1) come into operation before the regulator transistor is subjected to the maximum power dissipation $P_f$ last mentioned and have the effect of reducing the regulator transistor dissipation to zero or to an insignificantly small value. In modifications of the invention presently to be described, the regulator transistor during severe overload conditions may be subjected during recurrent very short intervals to relatively large values of dissipation of the order of the value $P_f$, but these intervals are separated sufficiently far in time by intervals of little or no dissipation that the regulator transistor and power supply system are both subjected to a very low value of average dissipation.

The FIG. 1 regulator system may have its Zener diode 45 and its resistor 44 arranged as indicated in FIG. 4 to provide a voltage divider connected across the input circuit of the regulator system and connected through a resistor 46 as shown to the base electrode 42 of the control transistor 39. The operation of the regulator system as thus modified is similar to that previously described except that the Zener diode 45 (which is preferred but in practice may be replaced by a resistor) is now conductive during normal operation of the system and provides at the base electrode 42 of the transistor 39 a relatively constant bias voltage of value less than the normal full-load output potential of the system. The transistor 39 under this condition is non-conductive and provides no control action. However, under overload conditions when the output circuit potential drops after a constant-current characteristic is imparted to the regulator transistor 17 by action of the diodes 36 and 37 as previously described, a preselected value of decreased output potential causes the emitter 41 of the transistor 39 to be at a lesser positive potential than the base electrode 42. A control current is now supplied through the resistor 46 to the base electrode so that the control transistor 39 becomes conductive and limits the magnitude of control current which may be supplied to the base electrode 20 of the regulator transistor 17. The circuit constants in this modified form of the FIG. 1 arrangement may be selected such that the control transistor 39 so reduces the base current of the regulator transistor 17 as to render the latter substantially non-conductive. As before, once transistor 39 is rendered conductive by conditions of overload or short circuit, as previously described, it will continue to remain conductive and hence render transistor 17 non-conductive upon restoration of normal load conditions. It is again necessary to actuate either the series switch 43 to interrupt the base current of the transistor 39 or the shunt switch 47 to bypass it, thereby restoring output condition to normal.

Figures 5, 6:
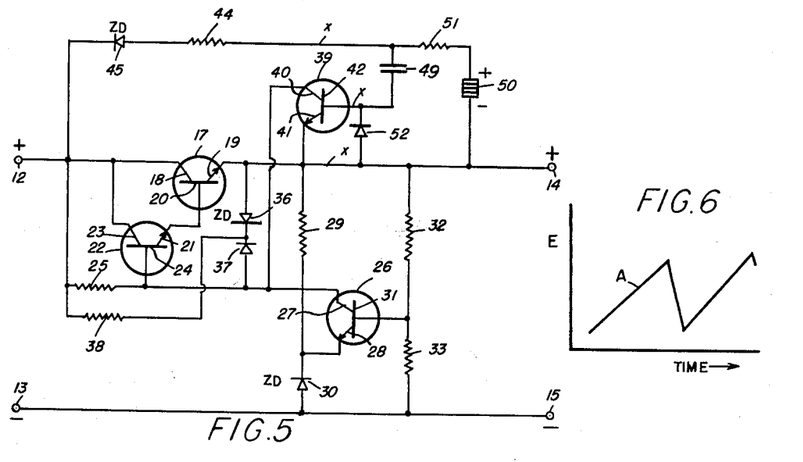

FIG. 5 is a circuit diagram showing a power supply regulator system essentially similar to the FIG. 1 system, similar circuit components being designated by similar reference numerals, but with the difference that the Zener diode 45 upon becoming conductive in response to a preselected decrease of output circuit potential (under a constant-current overload condition) renders the control transistor 39 conductive by supply of current to its base electrode 42 through a condenser 49. With a continuing overload condition prevailing, the condenser 49 charges to a potential at which a Shockley 4-layer semiconductive diode 50 is rendered conductive and thereupon discharges the condenser 49 through a current limiting protective resistor 51 and a semiconductor diode 52. While the condenser 49 is charging and supplies current to the base electrode 42 of the control transistor 39, the latter controls the regulator transistor 17 through the control transistor 22 in the manner previously described with reference to FIG. 1. This control action greatly reduces the collector-emitter current of the transistor 17 and thus limits the load current which may be drawn to a relatively small value. During each interval of discharge of the condenser 49 by the Shockley diode 50 as previously mentioned, no current is supplied to the base electrode 42 of the control transistor 39 so that the latter no longer limits the collector-emitter current of the regulator transistor 17 which may thus translate either a constant value of load current if the overload condition prevails or a normal value of load current if the overload condition has been removed. If upon completion of the discharge of the condenser 49 by the Shockley diode 50 the overload condition remains, current is once more supplied through the Zener diode 45, resistor 44, and condenser 49 to the base electrode 42 of the transistor 39 which again reduces the collector-emitter current of the transistor 17 as before. Thus as indicated graphically by curve A of FIG. 6, an oscillatory potential of sawtooth wave form is developed across the Shockley diode 50 by action of the periodic charge and discharge of the condenser 49 and this oscillatory condition prevails until the overload condition on the regulator system is removed.

Now when the overload condition no longer prevails, the output circuit potential of the system is restored and normal collector-emitter current of the transistor 17 is permitted to flow during a discharge interval of the condenser 49. This normal operating condition extinguishes the Zener diode 45 so that the oscillatory operation effected by the periodic charge and discharge of the condenser 49 ceases. The charge interval of the condenser 49, during which the regulator transistor 17 is substantially non-conductive, is determined by the time constant of the resistor 44 and condenser 49. The discharge interval of the condenser 49, during which the transistor 17 is permitted to become conductive, is determined by the time constant of the resistor 51 and condenser 49. The values of the resistors 44 and 51 and the value of the condenser 49 may be so selected that the average value of load current supplied to the output circuit of the regulator system by the transistor 17 may be substantially less than the value of constant current which the regulator transistor 17 is caused initially to translate under initial control of the control transistor 22 and diodes 36 and 37 at the outset of an overload condition and in the manner previously described in connection with FIG. 1. This average value of current is, of course, dependent upon the value of constant current of the regulator transistor 17 as established under control of the transistor 22 and diodes 36 and 37 as averaged over the cyclic perod comprised by the sum of one charge and discharge interval of the condenser 49 under control of the Shockley diode 50.

Figure 7:
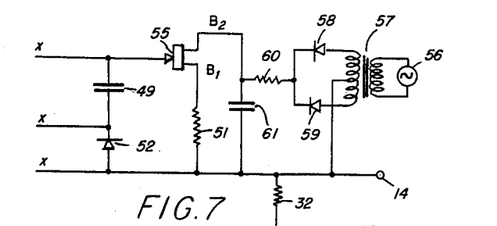
FIGS. 7 and 8 show modified forms of the FIG. 5 regulator sytem.

FIG. 7 is a circuit diagram of a modified form of oscillatory system suitable for use in the FIG. 5 arrangement by replacing those components to the right of the points x, x and x in FIG. 5 by the FIG. 7 component arrangement. As in the FIG. 5 arrangement, base control current is supplied to the control transistor 39 through the condenser 49, but in the modified form of oscillator system of FIG. 7 the condenser 49 upon charging to a preselected terminal potential is discharged by a unijunction form of transistor 55 through a discharge path which includes the current limiting resistor 51 and the semiconductor diode 52. Operating bias potential is supplied to the unijunction transistor 55 from a conventional full wave rectifier system energized from an alternating current source 56 and including a transformer 57, diode rectifiers 58 and 59, and a filter comprising a series resistor 60 and a shunt condenser 61. Aside from the use of the unijunction transistor 55 and its associated rectifier-type bias supply, the oscillatory operation of the FIG. 7 arrangement in effecting periodic charge and discharge of the condenser 49 with resultant periodic control of the regulator transistor 17 is the same as that previously described in connection with the FIG. 5 regulator system.

Figure 8:
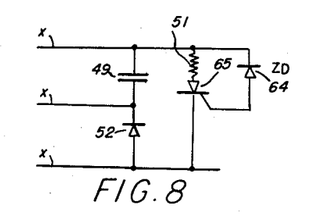

FIG. 8 is a circuit digram representing a further modified form of oscillatory system which may be used in the FIG. 5 regulator system in place of the components in FIG. 5 to the right of the circuit points x, x and x. In the FIG. 8 oscillatory system, a Zener diode 64 is responsive to the charge potential developed across the condenser 49 during supply of base current to the control transistor 39 and upon being rendered conductive by a sufficiently high charge potential causes a silicon control type of rectifier device 65 also to become conductive and discharge the condenser 49 through the resistor 51 and semiconductor diode 52. Upon discharge of the condenser 49, the Zener diode 64 again becomes nonconductive and renders the silicon control rectifier 65 also nonconductive whereby the condenser 49 is permitted again to charge and thereby supply base current to the control transistor 39. Aside from the manner of periodic discharge of the condenser 49 effected by the FIG. 8 arrangement, the regulator system of FIG. 5 when incorporating the oscillatory system of FIG. 8 has the same operation as previously described.

Figure 9:
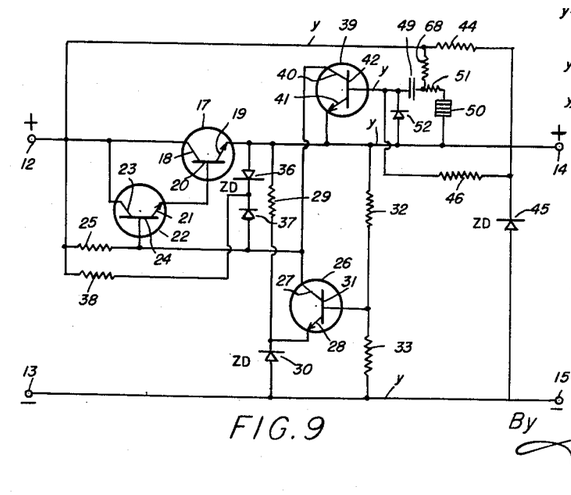
FIG. 9 is a circuit diagram representing a further modified form of the invention.

A modified form of the invention is utilized in the regulator system shown in FIG. 9, which is essentially similar to the system of FIG. 5 except that the resistor 44 and Zener diode 45 are connected in the FIG. 9 system across the input circuit of the system as in FIG. 4 and the base electrode 42 of the control transistor 39 is biased through the resistor 46 from the relatively constant reference potential developed across the Zener diode 45. Additionally, the condenser 49 in the FIG. 9 arrangement is also connected across the input circuit of the system through a resistor 68, the resistor 46 and the Zener diode 45 so that the condenser 49 periodically charges and is periodically discharged by the Shockley diode 50 during both normal operating conditions of the regulator system and during overload conditions thereof. Thus while the condenser 49 as it periodically charges and is periodically discharged is always conditioned to supply base current to the control transistor 39, the latter is maintained nonconductive during normal operating conditions of the system and until an overload condition drops the output circuit potential lower than the bias applied to the base elcetrode 42 through the resistor 46 from the Zener diode 45. Accordingly, the operation of the control transistor 39 in its control over the regulator system both during normal and overload conditions is that previously described in connection with FIG. 4 but of oscillatory nature as described with reference to FIG. 5.

Figure 10:
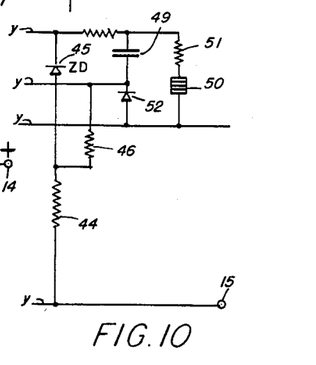
FIG. 10 represents a modification of the FIG. 9 system.

The positions of the resistor 44 and Zener diode 45 may be interchanged in the FIG. 9 system as indicated by the fragmentary schematic circuit of FIG. 10 which represents that portion of the FIG. 9 system to the right of the circuit points y—y. As in FIG. 4, the Zener diode 45 is preferred in FIG. 10 but may be replaced with a resistor. This modified form of arrangement has essentially the same operation as described with reference to FIG. 9 except that the value of output circuit potential at which the control transistor 39 becomes conductive and exerts control over the regulator transistor 17 varies directly with variations of the input circuit potential of the system. This in certain instances may have the advantage that the maximum value of potential that may appear across transistor 17 under normal conditions is established and limited by the potential appearing across the Zener diode 45. This limits the maximum permissible power dissipations of transistor 17 to a fixed value.

Figure 11:
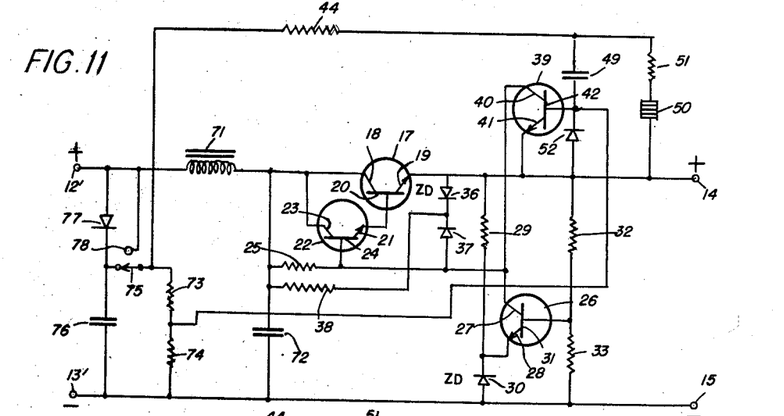
FIG. 11 is a circuit diagram of a regulator system embodying the invention in another form.

The modified form of regulator system embodying the invention and having the circuit arrangement of FIG. 11 is essentially similar to the FIG. 5 system earlier described except that the present system is shown by way of illustration as including a series choke coil 71 and a shunt condenser 72 which comprise the terminal filter stage of the unidirectional power supply system 10 of FIG. 1. Also in the present arrangement the base electrode 42 of the control transistor 39 is biased from a voltage divider comprised by series resistors 73 and 74 connected through a switch 75 across a condenser 76 charged by a diode rectifier 77 by the input circuit potential of the system. The time constant of the condenser 76 and voltage divider resistors 73 and 74 are so selected that the charge potential of the condenser 76 is approximately equal to the peak value of input circuit potential, which may be supplied as a full wave rectified voltage directly from the full wave rectifier of the unidirectional power supply. The unidirectional voltage developed across the voltage divider resistor 74 is selected to have a value always less than the output circuit potential of the regulator system at normal full load output current, so that the control transistor 39 is normally nonconductive. However, a decrease of the output circuit potential due to an excessive overload or a short circuit condition causes the emitter electrode 41 of the control transistor 39 to be at a lesser positive potential than is developed across the voltage divider resistor 74 and applied to the base electrode 42 so that the transistor 39 is thereupon rendered conductive by base current supplied by the charging current of the condenser 49. The transistor 39 upon becoming thus conductive reduces the collector-emitter current of the regulator transistor 17 in the manner previously described, and this control condition continues during the charge interval of the condenser 49 and until its terminal voltage rises sufficiently to render the Shockley diode 50 conductive and thereby discharge the condenser. As previously explained, the control transistor 39 is rendered non-conductive during the discharge interval of the condenser 49 so that during this interval also the regulator transistor 17 may translate a constant value of current as determined by the control transistor 22 operating under control of the Zener diode 36 and diode 37 if an excessive load condition prevails or to translate normal current if the excessive load condition has been removed. The periodic charge and discharge of the condenser 49 during excessive load current conditions, and the resultant control over the conductivity of the regulator transistor 17 by the control transistor 39, is thus essentially that previously described in connection with the FIG. 5 arrangement. The control terminates when the output circuit potential again rises to a value such that the emitter 41 of the control transistor 39 is at a higher positive potential than the base electrode 42 as established by the voltage developed across the voltage divider resistor 74. Manual actuation of the switch 75 to close its contacts 78 provides essentially the same mode of operation as that described but with the slight difference that the control transistor 39 begins its control action near the peak voltage of the full-wave rectified potential applied to the input circuit of the system. Thus whereas in the arrangement earlier described a constant value of potential is applied to the base electrode of the transistor 39 from the voltage divider 73, 74 so that the control of the transistor 39 may begin immediately with sufficient drop of the output circuit potential, the positioning of the switch 75 to close its contact 78 may at times effect small delays in the control action if the output circuit potential should drop at a time when the input circuit potential does not have substantially its maximum instantaneous positive value.

Figure 12:
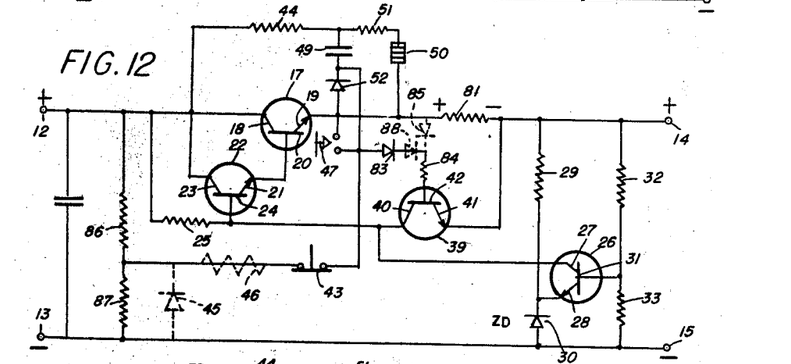
FIGS. 12 and 13 are circuit diagrams of power supply regulator systems embodying the present invention in yet other forms.

FIG. 12 is a circuit diagram of a regulator system embodying the invention in a form wherein the control transistor 39 serves the dual function of (1) providing constant-current operation of the regulator transistor 17 for a moderate amount of output current overload and (2) provides a substantially lesser average value of permissible output current under conditions of severe overload or short circuiting of the output circuit. The output circuit of the present arrangement includes a series resistor 81 through which the load current flows and which develops a potential drop of the polarity indicated. This potential drop is applied as base input drive to the transistor 39 through the semiconductor diode 52, a semiconductor diode 83, and a resistor 84 connected between the emitter electrode 19 of the transistor 17 and the base electrode 42 of the transistor 39.

The diodes 52 and 83 are preferably of the silicon type which exhibit a sufficient energy barrier to electron flow as to permit a voltage drop of approximately one volt to be developed across the resistor 81 before the transistor 39 is rendered conductive by this voltage drop. The value of the resistor 81 is selected such that the transistor 39 becomes conductive at slightly more than the full load output current of the system, and upon becoming thus conductive so controls the regulator transistor 17 through the transistor 22 as to cause the transistor 17 to have a constant-current characteristic for reasons explained earlier. A semiconductor diode 85, shown in broken lines, may be connected between the positive terminal of the resistor 81 and the resistor 84 to reduce the value of potential drop needed across the resistor 81 to render the transistor 39 conductive if this lowered potential drop is desirable in a particular application. Where it is desired to have more potential drop across the resistor 81 before constant current operation takes place, an additional diode 88 shown in broken lines may be used in series with the diode 83. It will accordingly be evident that the transistor 39 imparts a constant-current characteristc to the regulator transistor 17 for output load currents moderately in excess of full load current, the precise value of output load current at which constant-current limiting begins being determined by the value of the resistor 81, the forward voltage drop of the semiconductor diodes 52, 83 and any extra diodes, such as the diode 88 (or the forward voltage drop of the semiconductor diode 85 if used) and the required value of input voltage which must be applied to the base 42 of the transistor 39 to render the latter conductive.

The present arrangement also includes a voltage divider comprised by series resistors 86 and 87 which apply to the semiconductor diode 52 through the switch 43 a bias potential of value less than the output circuit potenital of the system at normal full load current. Now when the output circuit voltage drops due to more than moderate overload or to a short circuit condition, the diode 83 becomes conductive to render the transistor 39 fully conductive as soon as the output circuit voltage decreases to a value less than the voltage developed across the resistor 87. The fully conductive state of the transistor 39 now substantially reduces the collector-emitter current of the regulator transistor 17 in the manner previously described and thus cuts off or reduces to a relatively low value the load current which may be translated by the transistor 17. During this condition of reduced output current, an appreciable voltage drop is developed across the transistor 17 and the condenser 49 now charges through the resistor 44 until the terminal voltage of the condenser is sufficient to render the Shockley diode 50 conductive. The conductive state of the latter discharges the condenser 49, and during the discharge interval a potential drop is developed across the diode 52 of such polarity as to make the anode of the diode 83 negative with respect to its cathode. The diode 83 then is no longer conductive and the resultant reduced conductivity of the transistor 39 permits the regulator transistor 17 to translate full load current. If at the end of the discharge interval of the condenser 49 the overload condition continues to prevail, the transistor 39 again substantially reduces the load current translated by the transistor 17, the condenser 49 again charges, and the operation previously described is repeated. Accordingly, during the period when the excess overload prevails the oscillatory control over the transistor 39 by the periodic charge and discharge of the condenser 49 results in such control of the regulator transistor 17 as to cause the latter to translate a relatively low average value of output current. Normal voltage regulation of the regulator transistor 17 is restored when the excessive output load condition is removed.

As in the arrangement of FIG. 4, the voltage divider resistor 87 may be replaced by the Zener diode 45 shown in broken lines in FIG. 12, and in this event the series resistor 46 (also shown in broken lines) is included in circuit between the Zener diode 45 and the cathode of the diode 52. The operation of the regulator system is not essentially changed by reason of this modification. If the oscillatory system comprised by the condenser 49, the Shockley diode 50, and the resistors 44 and 51 is omitted from the system, the control transistor 39 upon being rendered fully conductive by an excessive overload condition remains so conductive even though the overload condition is removed. In this event the FIG. 12 system is restored to normal operation, as previously described in connection with the FIG. 1 system, by manual operation of either the series switch 43 or the shunt switch 47 to render the control transistor 39 again non-conductive.

Figure 13:
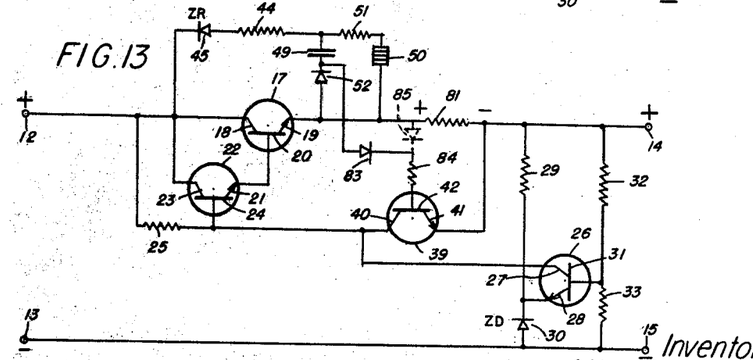

The regulator system shown in FIG. 13 is essentially similar to that shown and described in connection with FIG. 12 except that the FIG. 13 system omits the voltage divider comprised by the resistors 86 and 87 in FIG. 12 and the Zener diode 45 is included in series with the resistor 44 in the charging circuit of the condenser 49. In this modified form of arrangement, the control transistor 39 causes the regulator transistor 17 to have a constant-current characteristic upon moderate values of overload current as described in connection with FIG. 12. However, an excessive overload condition produces a sufficient voltage drop across the regulator transistor 17 as to render the Zener diode 45 conductive and this establishes a charge circuit for the condenser 49 through the resistor 44. The charging current of the condenser 49 is now applied to the base electrode 42 of the control transistor 39 through the diode rectifier 83, and the transistor 39 is thereupon rendered fully conductive to effect substantial reduction of the current translated by the regulator transistor 17. Upon discharge of the condenser 49 by the Shockley diode 50, the potential developed across the diode 52 reverse biases the diode 83 and renders it non-conductive except for the conduction due to the potential drop across the resistor 81 with the result that a transistor 39 now permits the regulator transistor 17 to translate full output current. Thus the control transistor 39 in the FIG. 13 arrangement performs the same dual overload functions as in the similar arrangement of FIG. 12.

It will be apparent from the foregoing description of the invention that a voltage regulator system embodying the invention not only establishes a limitation upon the maximum value of overload current which may be supplied in moderate excess of full load output current, but also is responsive to only slightly more severe overload conditions to effect substantial reduction of the load current to a relatively low average value. This automatic and very effective protection of the regulator system may terminate further supply of load current if desired, or the protection may continue until the overload condition is removed after which the protection automatically ceases. A regulator system embodying the invention has the additional advantages that it may be of the fully transistorized type and thus be characterized by high operating efficiency and small and compact physical size, yet provides an excellent voltage regulation characteristic over its full range of rated load current values while at the same time affording full protection to its semiconductor devices under all prevailing load conditions which tend to cause its rated value of full load current to be exceeded.

While specific forms of the invention have been described for purposes of illustration, it is contemplated that numerous changes may be made without departing from the spirit of the invention.

What is claimed is:

1. An electrical power supply regulator system comprising an input circuit adapted to be coupled to a source of unidirectional power and an output circuit, power translating means for supplying electrical power from said input circuit to said output circuit from which power normally at substantially constant voltage may be supplied to a load device, first control means responsive to an increase of current of said output circuit above the current value at full-load output current for controlling said translating means initially to establish a limit upon the maximum value of current which may thereafter be translated by said translating means, second control means responsive to a decrease of said output voltage below said substantially constant voltage output for further controlling said translating means substantially to reduce the value of current translated by said translating means, and means responsive to said reduced voltage translation for periodically reestablishing said constant-current control over said translating means by said first control means to limit for the duration of said decrease of output voltage the average value of current translated by said translating means.

2. An electrical power supply regulator system comprising an input circuit adapted to be coupled to a source of unidirectional power and an output circuit, power translating means for supplying electrical power from said input circuit to said output circuit from which power normally at substantially constant voltage may be supplied to a load device, first control means responsive to an increase of current of said output circuit above the current value at full-load output for controlling said translating means initially to establish a limit upon the maximum value of current which may thereafter be translated by said translating means, second control means responsive to a decrease of said output voltage below said substantially constant voltage output for further controlling said translating means substantially further to reduce the value of current translated by said translating means, and oscillatory means having an operation initiated in response to said reduced voltage translation for periodically reestablishing said constant-current control over said translating means by said first control means to limit for the duration of said decrease of output voltage the average value of current translated by said translating means.

3. An electrical power supply regulator system comprising an input circuit adapted to be coupled to a source of unidirectional power and an output circuit, a transistor having a base electrode and having collector and emitter electrodes serially connected between said input and output circuits for supplying electrical power from said input circuit through said output circuit to a load device, means responsive to said output circuit voltage for controlling a current supplied from said input circuit to said base electrode to maintain the voltage of said output circuit substantially constant, and means responsive to an initial increase of current of said output circuit above the current value at full-load output for limiting the current supplied to said base electrode initially to establish a limit upon the maximum value of current which may thereafter be translated by said transistor and responsive to a decrease of said output voltage for further periodically decreasing for the duration of said decrease of output voltage the current supplied to said base electrode to limit the average value of current which may thereafter be translated by said transistor.

4. An electrical power supply regulator system comprising an input circuit adapted to be coupled to a source of unidirectional power and an output circuit, a transistor having a base electrode and having collector and emitter electrodes serially connected between said input and output circuits for supplying electrical power from said input circuit through said output circuit to a load device, means responsive to said output circuit voltage for controlling a current supplied from said input circuit to said base electrode to maintain the voltage of said output circuit substantially constant, semiconductive means repsonsive to an initial increase of current of said output circuit above the current value at full-load output for placing a fixed limit upon the current supplied to said base electrode to establish a limit upon the maximum value of current which may thereafter be translated by said transistor, and semiconductive means responsive to a decrease of said output voltage for substantially terminating periodically during the interval of said decrease of output voltage the current supplied to said base electrode to limit the average value of current which may thereafter be translated by said transistor.

5. An electrical power supply regulator system comprising an input circuit adapted to be coupled to a source of unidirectional power and an output circuit, a transistor having a base electrode and having collector and emitter electrodes serially connected between said input and output circuits for supplying electrical power from said input circuit through said output circuit to a load device, means responsive to said output circuit voltage for controlling a current supplied from said input circuit to said base electrode to maintain the voltage of said output circuit substantially constant, means responsive to an initial increase of current of said output circuit above the current value at full-load output for limiting the current supplied to said base electrode initially to establish a limit upon the maximum value of current which may thereafter be translated by said transistor, and self-oscillatory means effective upon a reduction of said output voltage below said substantially constant value for substantially terminating periodically during the interval of said reduced voltage the current supplied to said base electrode to limit the average value of current which may thereafter be translated by said transistor.

6. An electrical power supply regulator system comprising an input circuit adapted to be coupled to a source of unidirectional power and an output circuit, a transistor having a base electrode and having collector and emitter electrodes serially connected between said input and output circuits for supplying electrical power from said input circuit through said output circuit to a load device, transistor means responsive to said output circuit voltage for controlling a current supplied from said input circuit to said base electrode to maintain the voltage of said output circuit substantially constant, semi-conductive voltage-break-down means responsive to an initial increase of current of said output circuit above the current value at full-load output for establishing a substantially fixed limit upon the current supplied to said base electrode to establish a constant-current limit upon the maximum value of current which may thereafter be translated by said transistor, and semiconductive voltage-break-down means responsive to a decrease of said output voltage below said substantially constant value of voltage after establishment of said constant-current limit for further periodically decreasing the current supplied to said base electrode to limit the average value of current which may thereafter be translated by said transistor during the period of said decrease of output voltage.

References Cited by the Examiner
UNITED STATES PATENTS

| | | | |
|---|---|---|---|
| 2,832,900 | 4/58 | Ford | 323—22 |
| 2,915,693 | 12/59 | Harrison | 323—22 |
| 2,942,174 | 6/60 | Harrison | 323—22 |
| 2,981,884 | 4/61 | Tighe | 323—22 |
| 3,079,543 | 2/63 | Decker | 323—22 |
| 3,105,188 | 9/63 | Harrison | 323—22 |

LLOYD McCOLLUM, *Primary Examiner.*

ORIS L. RADER, *Examiner.*